(12) United States Patent
Lebby et al.

(10) Patent No.: US 11,506,918 B2
(45) Date of Patent: Nov. 22, 2022

(54) HYBRID EO POLYMER MODULATOR WITH ALD SEALANT LAYER

(71) Applicant: Lightwave Logic Inc., Englewood, CO (US)

(72) Inventors: Michael Lebby, San, CA (US); Zhiming Liu, Parker, CO (US); Baoquan Chen, Lone Tree, CO (US)

(73) Assignee: Lightwave Logic Inc, Englewood, CO (US)

( * ) Notice: Subject to any disclaimer, the term of this patent is extended or adjusted under 35 U.S.C. 154(b) by 3 days.

(21) Appl. No.: 17/335,375

(22) Filed: Jun. 1, 2021

(65) Prior Publication Data

US 2022/0187638 A1    Jun. 16, 2022

Related U.S. Application Data

(63) Continuation-in-part of application No. 17/121,118, filed on Dec. 14, 2020, now abandoned.

(51) Int. Cl.
*G02F 1/065* (2006.01)

(52) U.S. Cl.
CPC .................................. *G02F 1/065* (2013.01)

(58) Field of Classification Search
CPC .... G02F 1/065; G02F 1/0356; G02F 2201/06; G02F 2202/022
See application file for complete search history.

(56) References Cited

U.S. PATENT DOCUMENTS

| | | | |
|---|---|---|---|
| 7,693,355 B2 * | 4/2010 | Peyghambarian | G02F 1/065 385/129 |
| 7,738,745 B2 * | 6/2010 | Koenig | G02F 1/0147 385/2 |
| 7,912,327 B2 * | 3/2011 | DeRose | G02F 1/065 385/129 |

\* cited by examiner

*Primary Examiner* — John Bedtelyon
(74) *Attorney, Agent, or Firm* — Parsons & Goltry; Robert Parsons; Michael Goltry

(57) ABSTRACT

An EO polymer modulator with conformal atomic layer deposition sealant layers including an active region of a device material stack with an elongated tapered active section positioned on a passive waveguide core. The device material stack supported on a substrate with the passive waveguide core defining light input and light output side surfaces. A conformal atomic layer deposition sealant layer overlying the device material stack including the light input and light output side surfaces, the conformal atomic layer deposition sealant layer defining windows for the light input and light output side surfaces.

19 Claims, 12 Drawing Sheets

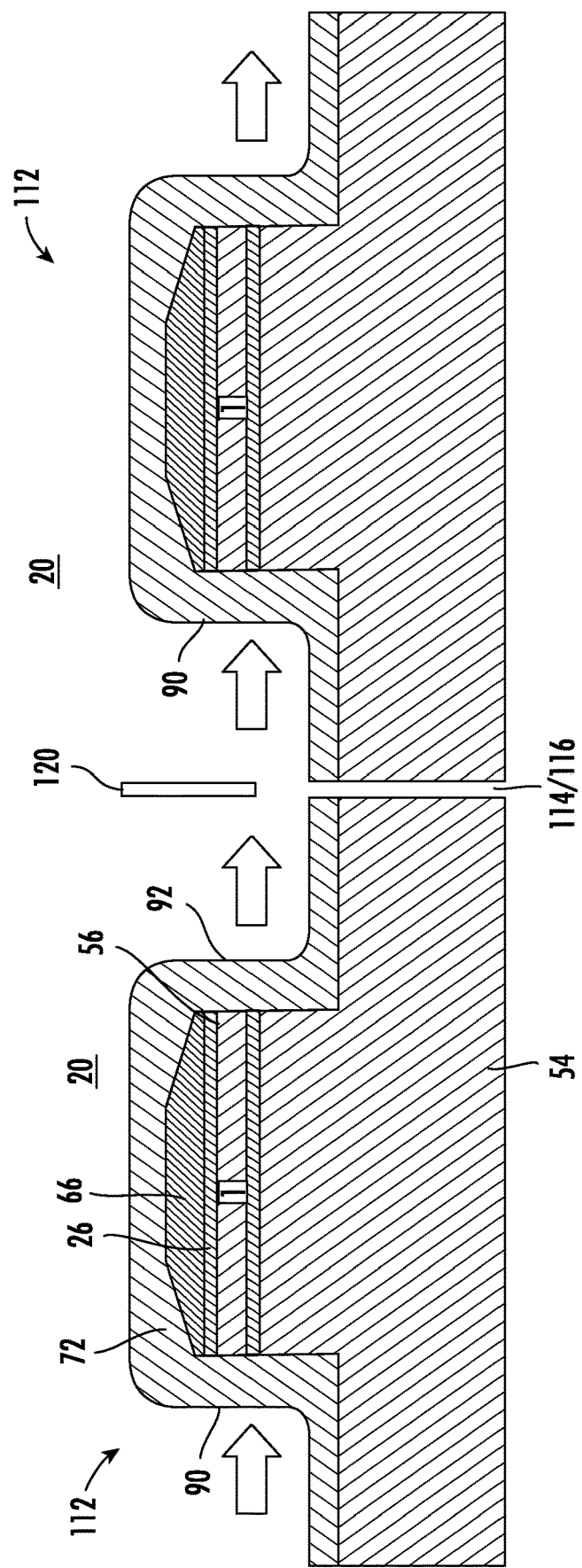

HYBRID EO POLYMER MODULATOR WITH ALD SEALANT LAYER

CROSS-REFERENCE TO RELATED APPLICATION

This application is a Continuation-in-Part of U.S. patent application Ser. No. 17/121,118, filed 14 Dec. 2020, and claims the benefit thereof.

FIELD OF THE INVENTION

This invention relates to the combination of silicon passive waveguides with EO polymer modulators to form active modulation waveguides and ALD (atomic layer deposition) sealant layers encapsulating the structure.

BACKGROUND OF THE INVENTION

In general, prior designs of EO polymer modulators are based on multilayer polymer structures, where every layer of polymer needs to meet a set of processing requirements in order to have the next polymer materials to be able to be put upon the polymer layer beneath. For example, by spin coating of EO polymer solution on to a bottom cladding layer, the bottom cladding layer needs to be able to resist the solvent used for the EO polymer solution. In another example, in order to coat top cladding layer material onto an EO layer, the solvent for the top cladding layer must not dissolve or substantially swell the EO polymer layer. These processing compatibility requirements for each layer substantially complicate the material development.

In prior art sealing techniques, because of potential pin holes in the encapsulation layer, the layer must be very thick which causes problems with attempts to seal at wafer levels. Further, encapsulation layers generally planarize the structure so that separating a wafer into individual chips is very difficult. Also, windows for light to enter and exit modulators and the like are poor or nearly nonexistent. Further, chip dicing can further reduce window integrity.

In general, prior designs of EO polymer modulators require the cladding materials have higher conductivity at poling temperatures so the poling can be efficiently done to the core EO polymer layer in the device stack with cladding layers.

In general, prior designs of EO polymer modulators require each overlying layer can adhere well to a bottom layer. Also, prior designs need to develop the waveguide structure in the polymer stack, which involves etching some of the polymer, requiring fine, precise lithographic process over the thin film polymer layer.

It would be highly advantageous, therefore, to remedy the foregoing and other deficiencies inherent in the prior art.

Accordingly, it is an object of the present invention to provide a new and improved hybrid EO polymer modulator with silicon photonics and ALD sealant layer or layers.

It is another object of the present invention to provide a new and improved hybrid EO polymer modulator with a thin conformal sealant layer or layers.

It is another object of the present invention to provide a new and improved hybrid EO polymer modulator in which the EO polymer can be conveniently poled.

It is another object of the present invention to provide a new and improved hybrid EO polymer modulator that can be easily encapsulated at the wafer level and easily diced while protecting window integrity.

SUMMARY OF THE INVENTION

To achieve the desired objects and advantages of the present invention an EO polymer modulator with conformal atomic layer deposition sealant layers is provided including an active region of a device material stack including an elongated tapered active section positioned on a passive waveguide core. The device material stack is supported on a substrate with the passive waveguide core defining light input and light output side surfaces. A conformal atomic layer deposition sealant layer overlies the device material stack including the light input and light output side surfaces, the conformal atomic layer deposition sealant layer defines windows for the light input and light output side surfaces.

To further achieve the desired objects and advantages of the present invention a specific embodiment of an EO polymer modulator with conformal atomic layer deposition sealant layers is disclosed. The EO polymer modulator includes a substrate with a cladding layer formed on a surface and a passive waveguide core, having a cross-sectional area, formed in the cladding layer and including an elongated tapered active section. An elongated trench is formed in the cladding layer and the elongated tapered active section of the waveguide core is positioned in the elongated trench. Electrodes are positioned on a surface of the cladding layer on opposite sides of the elongated trench. An elongated strip of EO polymer overlies the elongated tapered active section of the waveguide core, the elongated strip of EO polymer is positioned between and parallel with the electrodes and coplanar with the electrodes. A conformal sealant layer is deposited overlying the elongated strip of EO polymer and sealing sides and top of the passive waveguide core and the elongated strip of EO polymer.

To further achieve the desired objects and advantages of the present invention a specific method of fabricating an EO polymer modulator with conformal atomic layer deposition sealant layers includes the steps of providing a substrate and forming an active region of a device material stack on the substrate including an elongated tapered active section positioned on a passive waveguide core. The device material stack is supported on the substrate with the passive waveguide core defining light input and light output side surfaces. Using atomic layer deposition, deposit a plurality of atomic layers over the device material stack to form a conformal sealant layer over an upper surface and light input and light output side surfaces of the device material stack.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIG. 12 illustrates a wafer dicing process for the Mach-Zehnder modulator of FIG. 7 in accordance with the present invention.

DETAILED DESCRIPTION OF THE DRAWINGS

Turning now to FIGS. 1 through 4, steps are illustrated in the fabrication of a Mach-Zehnder modulator 20 in accordance with the present invention. For convenience of understanding and to reduce the complexity of the disclosure, cross-sectional views of only one leg of Mach-Zehnder modulator 20 are illustrated, with the understanding that the opposite leg is as identical as possible. Also, while a Mach-Zehnder modulator is illustrated as a discrete component, it will be understood that modulator 20 may be a part of a silicon photonic structure with light wave input and output waveguides that are a part of the same or another silicon photonic structure. Further, some photonic components that can be incorporated in either or both of the input and output photonic structures are, for example, large spot waveguides, mux/demux (multiplies/demultipliers), for example, Echelle gratings, couplers, splitters, etc. Many of these photonic devices are illustrated and explained in a U.S. Pat. No. 10,574,025, entitled "Hermetic Capsule and Method for a Monolithic Photonic Integrated Circuit", issued Feb. 25, 2020, and incorporated herein by reference.

Figure 1:
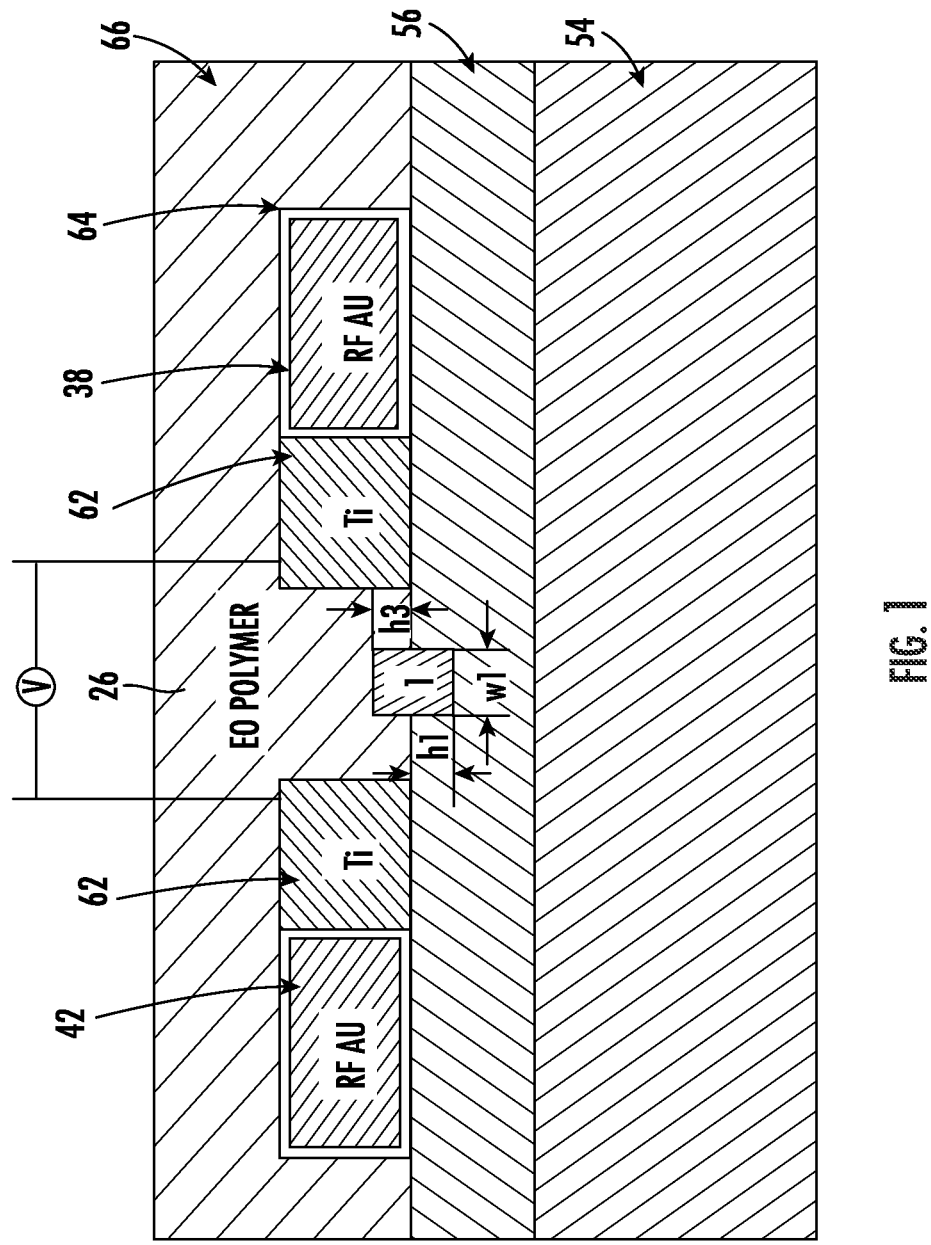
FIG. 1 illustrates process steps in the fabrication of a Mach-Zehnder modulator with co-planar electrodes, including a polymer poling step, in accordance with the present invention.

Referring specifically to FIG. 1, some components of an active region of a device material stack are illustrated. The device material stack is deposited on a substrate 54. Which may be composed of Si or some silicon composition such as $Si_3N_4$. A cladding layer 56 is formed on the surface of substrate 54 and includes material such as $SiO_2$, with a refractive index lower than an EO polymer used in other components of the stack. A centrally located trench includes the single leg 26 of Mach-Zehnder modulator 20. At this point in the fabrication process, the trench can include air, Si, $Si_3N_4$, InP, $LiNbO_3$, or doped high reflective index $SiO_2$. It will be understood that when the trench includes air both legs taper down in cross-sectional dimensions to zero near the input ends and taper back up (increase in size), to the original size near the output ends. When the trench includes Si, $Si_3N_4$, InP, $LiNbO_3$, or doped high reflective index $SiO_2$ both legs taper down in cross-sectional dimensions to smaller dimensions, either thinner in height and/or narrower in width, near the input ends and taper back up (increase in size), to the original size near the output ends.

Elongated auxiliary metal poling electrodes 62 are deposited and spaced apart on either side of the trench. The auxiliary metal may include Ti, Al, Cr, Au, Cu, Ta or any combinations thereof. RF electrodes 38 and 42 are deposited on opposite sides of poling electrodes 62. Poling electrodes could be ITO (transparent indium tin oxide) that is both conductive electrically and optically transparent. When poling electrodes 62 are formed as independent electrodes an isolation layer is formed to separate RF electrodes 38 and 42 from poling electrodes 62. The isolation layer is optional when poling electrodes 62 are composed of metals other than gold (Au) or when RF electrodes 38 and 42 are used as the poling electrodes in certain designs.

The process continues with a step of depositing a layer 66 of EO polymer. This step can usually be done by spin coating an EO polymer solution followed with drying, for example with a combination of soft bake, hard bake in an inert atmosphere, and a vacuum bake. An electric field is applied across poling electrodes 62 while simultaneous heating the structure (at least layer 66 of EO polymer) to a certain temperature to align (or pole) the permanent dipole chromophore molecules and then cooling layer 66 of EO polymer to a lower temperature while keeping electric field applied to keep the aligned chromophore molecules in an ordered state. As is understood in the art, poling consists of heating the polymer to a temperature near or at the glass transition temperature (Tg) of the material and applying an electric field to align the chromophore molecules (or a substantial quantity of them). In this specific embodiment, the electric field is wholly applied over the single EO polymer layer 36 without other cladding layers, so that the poling is controlled better and more predictably.

Figure 2:
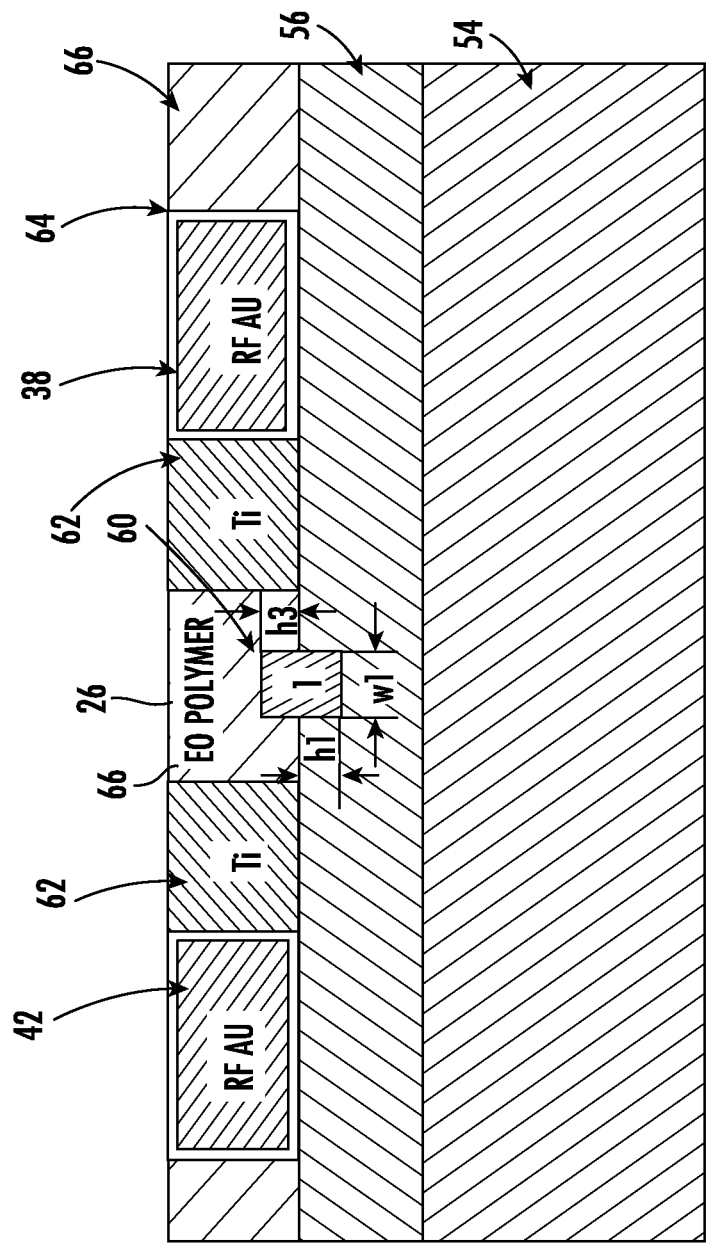
FIG. 2 illustrates additional process steps in the fabrication of a Mach-Zehnder modulator with co-planar electrodes performed on the structure of FIG. 1 in accordance with the present invention.
Figure 3:
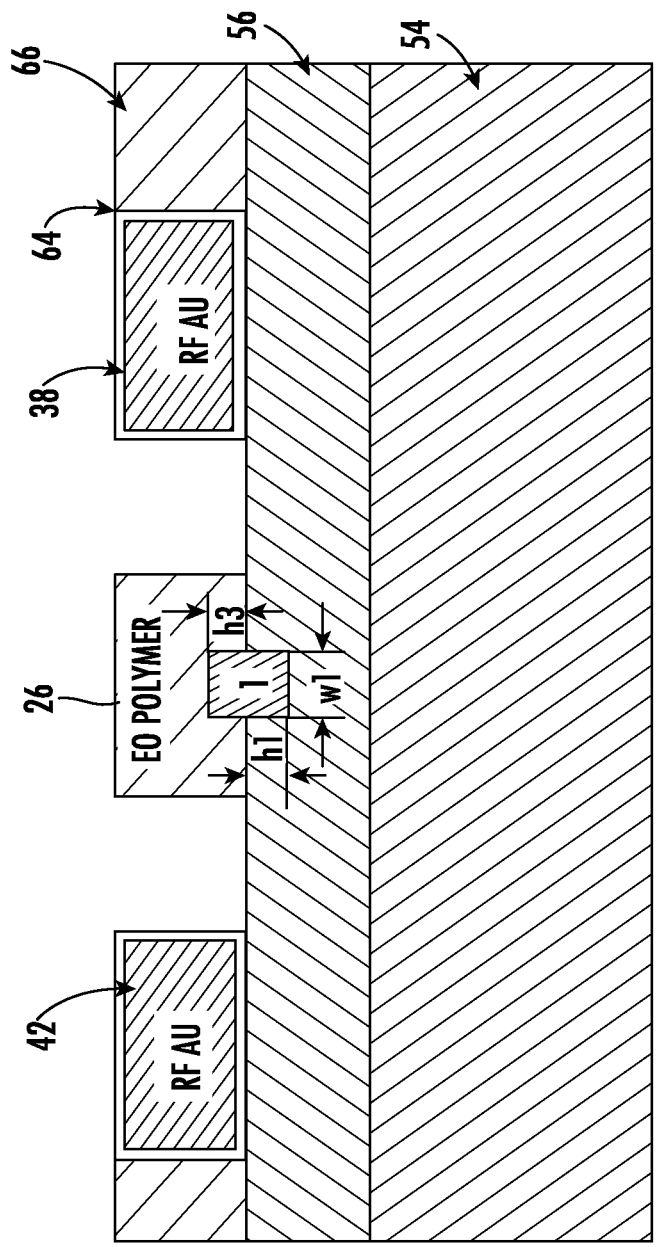
FIG. 3 illustrates additional process steps in the fabrication of a Mach-Zehnder modulator with co-planar electrodes, performed on the structure of FIG. 2 in accordance with the present invention.
Figure 4:
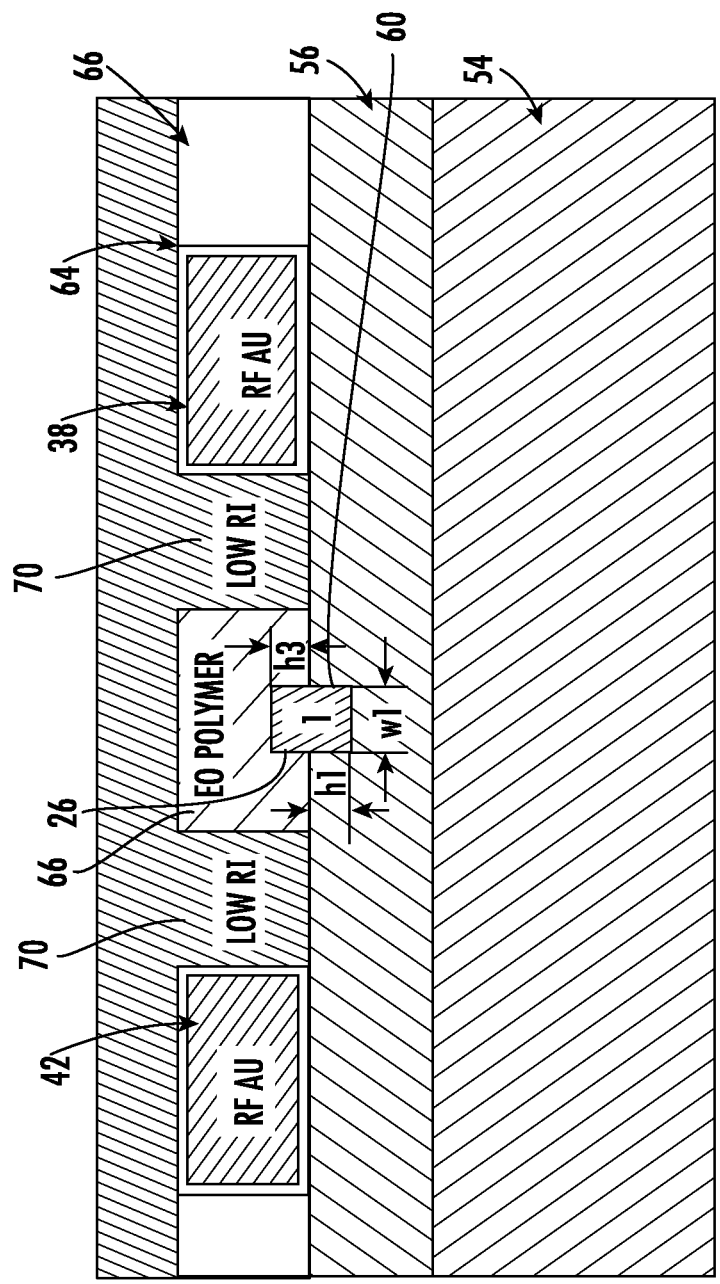
FIG. 4 illustrates additional process steps in the fabrication of a Mach-Zehnder modulator with co-planar electrodes, performed on the structure of FIG. 3 in accordance with the present invention.

Referring now to FIG. 2, EO polymer layer 66 is etched back to expose poling electrodes 62. Poling electrodes 62 can then be selectively etched away, as illustrated in FIG. 3, either by wet or dry etching methods well-known in the art which has little or no effect on the operation and integrity of the EO polymer layer. Here it will be noted that EO polymer layer 66 remains in overlying relationship with the trench to complete the active portion of the modulator legs. In the embodiments where the trench is filled with air, EO polymer layer 66 fills the trench. Referring additionally to FIG. 4, a low refractive index optical material 70 is deposited, preferably by spin coating or vacuum deposition, over the structure illustrated in FIG. 3 filling the trenches left by the removal of poling electrodes 62. Low refractive index optical material 70 can be for example, but not limited to, $SiO_2$, polymer, UV curable spin-on material, etc. In this step, the deposition temperature, drying, curing, or baking temperatures must be lower than any de-poling temperature of EO polymer layer 66 (see poling temperatures explained above).

Thus, the wave guide cores of the legs for Mach-Zehnder modulator 20 are relatively high refractive index silicon surrounded by lower refractive index dielectric material 70, such as $Si_3N_4$, $SiO_x$, etc. and the area between the tapered ends is either EO polymer or the high refractive index material covered with EO polymer. For purposes of understanding and selection, the refractive indices of various materials is as follows; silicon 3.5; $SiO_2$ 1.45; $Si_3N_4$ 2.0; $SiO_x$ 1.45-2.0 (linear in % Ox); EO polymer 1.8 (range 1.4-2.0). As light travelling from light input to the light output of modulator 20 reaches the missing or narrowed portions of the legs, some or all of the light transitions to EO polymer layer 66 and transitions back to the high refractive index silicon core as the active area returns to the normal cross-section or core dimensions. It should be understood that not necessarily all of the light progressing through the waveguide cores transitions into EO polymer layer 36 at the necked-down area but most of it does. The portions between tapers in the legs is hereinafter referred to as the "active portion" and the remaining waveguide core is referred to as the "passive portion". Thus, the active components and electrodes of the active region of the device material stack are completed in a novel co-planar arrangement.

Figure 5:
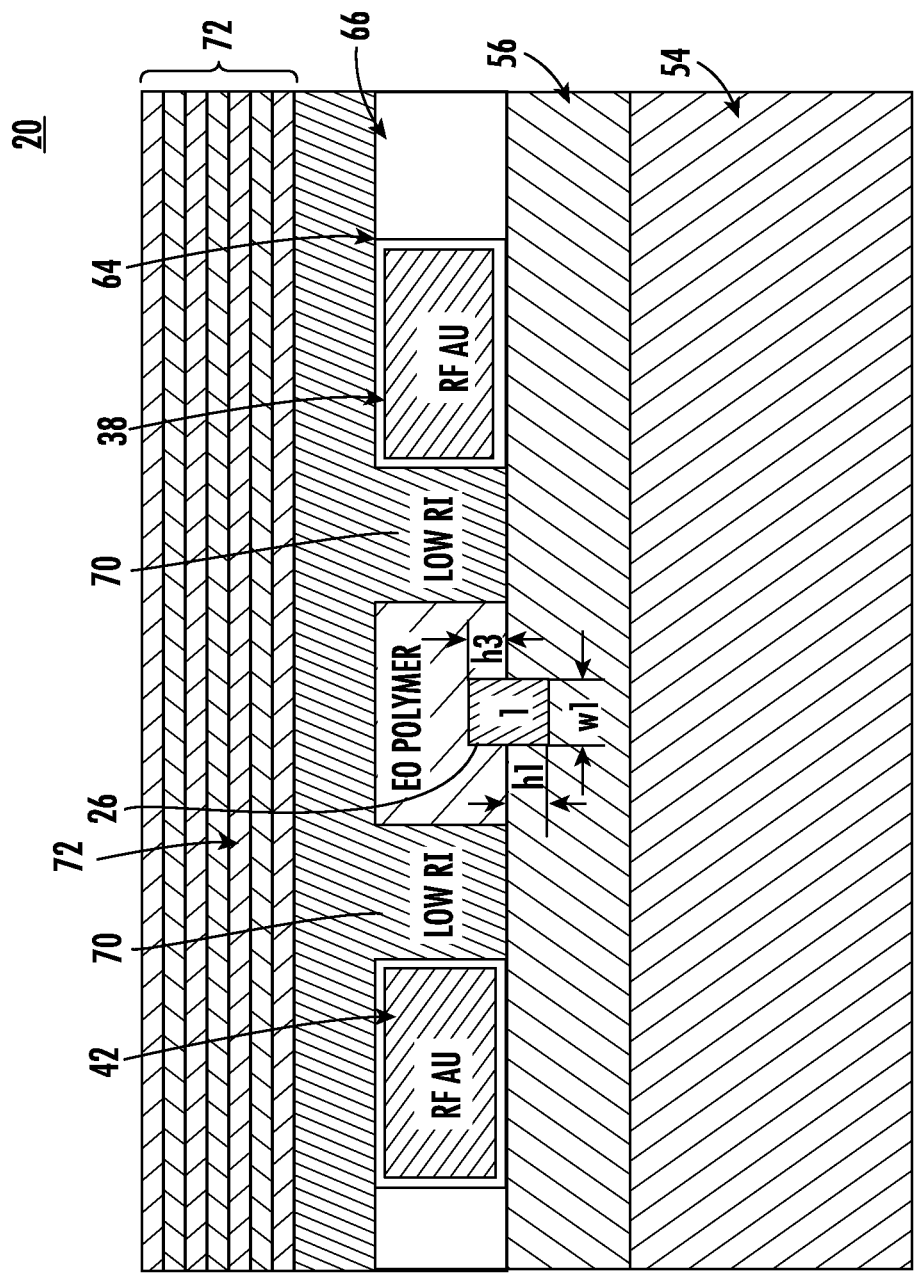
FIG. 5 illustrates additional process steps in the fabrication of a Mach-Zehnder modulator with co-planar electrodes, performed on the structure of FIG. 4 in accordance with the present invention.

Referring to FIG. 5, an encapsulation layer 72 is deposited over the structure illustrated in FIG. 4. Encapsulation layer 72 is an oxygen and water barrier composed of alumina, silica, other metal oxides, or any other material known to hermetically seal optical or electronic components or circuits. Encapsulation layer 72 is preferably deposited using a low temperature deposition method but, in any case, the deposition must be performed at a temperature lower than a temperature that will de-pole EO polymer layer 66. In a preferred example of encapsulation layer 72, aluminum oxide ($Al_xO_y$) is deposited using ALD (atomic layer deposition), which can seal the polymer and chromophores from at least oxygen (this is the killer specie) to greater than 99%. One of the characteristics of the ALD process is that it is self-limiting in its deposition process and, therefore, is a high quality sealant. In practice, encapsulation layer 72 can include any of the examples: a generic atomic layer deposition (ALD), a super lattice design using ALD; combinations of more than one oxide (e.g. 2 oxides or three oxides); combinations of oxide and nitride, or two oxides and one nitride, or two nitrides and one oxide; and use of aluminum oxide and other oxides such as titanium oxide.

In the specific example illustrated in FIG. 5, encapsulation layer 72 includes a plurality of alternating layers or sub-layers. In any case, the thickness of encapsulation layer 72 should be in a range of 1 nm to 200 nm with a preferred thickness in the range of 50 nm to 200 nm. Thus, in addition to water, moisture, nitrogen, etc. a modulator is designed that is pretty much hermetically sealed from both nitrogen and oxygen by using ALD deposition of $Al_xO_y$. It will be understood that because of the novel design of Mach-Zehnder modulator 20, including the co-planar electrodes and other active components, the structure can be easily encapsulated for oxygen and water protection.

Figure 6:
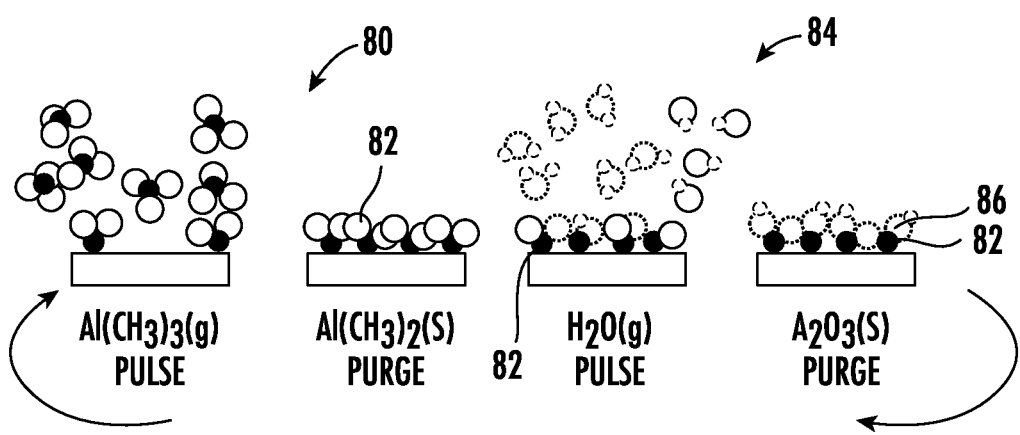
FIG. 6 illustrates steps in an atomic layer deposition process.

Turning to FIG. 6, some steps in an atomic layer deposition process are illustrated. It should be understood that ALD deposition is a CVD related technique for growing films one atomic layer at a time. As illustrated in the four steps shown in FIG. 6, a first material 80 is introduced into the vacuum chamber (pulse), an atomic layer 82 is grown and the chamber is purged. A second material 84 is introduced into the vacuum chamber (pulse), a second atomic layer 86 is grown on first atomic layer 82 and the chamber is purged. This process is repeated N times to achieve the desired qualities and thickness of a final film. The films grown by ALD are conformal, that is, end facets and top cladding are of uniform thickness and are all coated in a single deposition process. By growing the film layer by layer, nanocomposites can be grown that have superior properties, e.g. index matching, stress tolerance, etc. ALD grown films can be very high quality (i.e. pinhole free) and can be grown with a variety of layers to provide a barrier to $O_2$ with <100 nm coatings. Thin films are superior for tolerating stress induced by underlying films (i.e. CTE mismatches).

Figure 7:
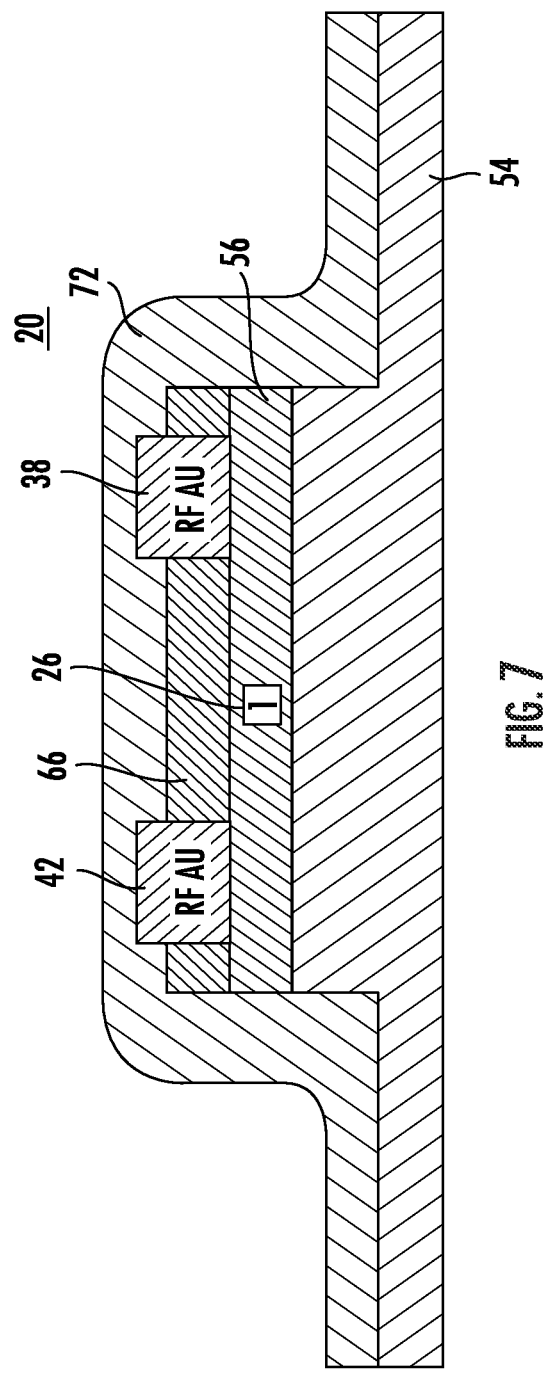
FIG. 7 illustrates a Mach-Zehnder modulator with co-planar electrodes and a conformal ALD sealant layer.

Turning to FIG. 7, an active area for a Mach-Zehnder modulator 20 is illustrated in Cross-section. For simplicity of understanding, the active area includes modulator leg 26 including EO polymer 66 embedded in cladding layer 56. RF auxiliary electrodes 38 and 42 are deposited on the surface of cladding layer 56 with EO polymer 66 deposited between. It will be understood that the active layer can include any of the various examples illustrated and described in the parent case or described above. Using the ALD process described in conjunction with FIG. 6 above, thin conformal sealant layer 72 is formed over the entire structure. The choice of conformal coating thickness is not restricted by the oxygen blocking requirement.

Figure 8:
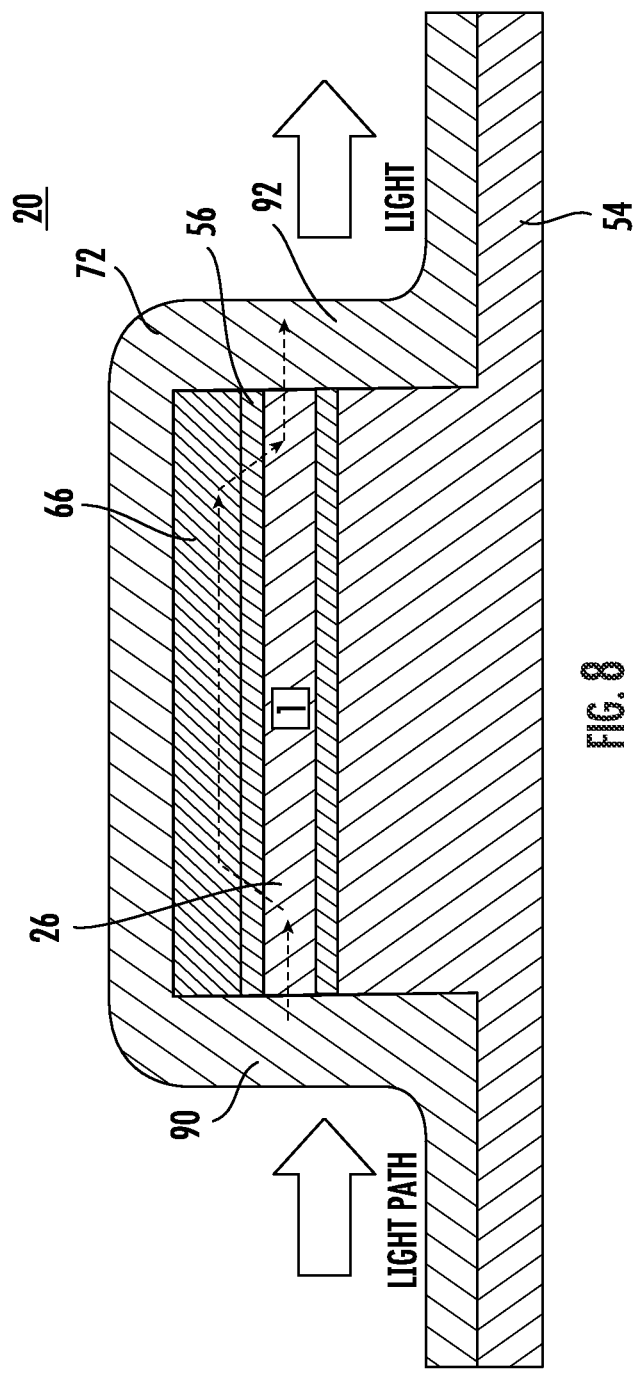
FIG. 8 is a broken away side view of the Mach-Zehnder modulator with co-planar electrodes and conformal ALD sealant layer of FIG. 7.

Referring additionally to FIG. 8, a broken away side view of Mach-Zehnder modulator 20 with co-planar electrodes and conformal ALD sealant layer 72 of FIG. 7 is illustrated. Light enters Mach-Zehnder modulator 20 through the left-hand vertical side of conformal ALD sealant layer 72, which acts as an input window 90 for the structure. As explained in detail above and in the parent case, the light transitions from the high refractive index silicon core to EO polymer layer 66 adjacent the left-hand edge of the active area and transitions back to the high refractive index silicon core adjacent the left-hand edge of the active area. The light exits Mach-Zehnder modulator 20 through the right-hand vertical side of conformal ALD sealant layer 72, which acts as an output window 92 for the structure. Thus, because of the conformal ALD coating, sealant layer 72 provides facet coatings or windows for light to enter and exit Mach-Zehnder modulator 20.

Figure 9:
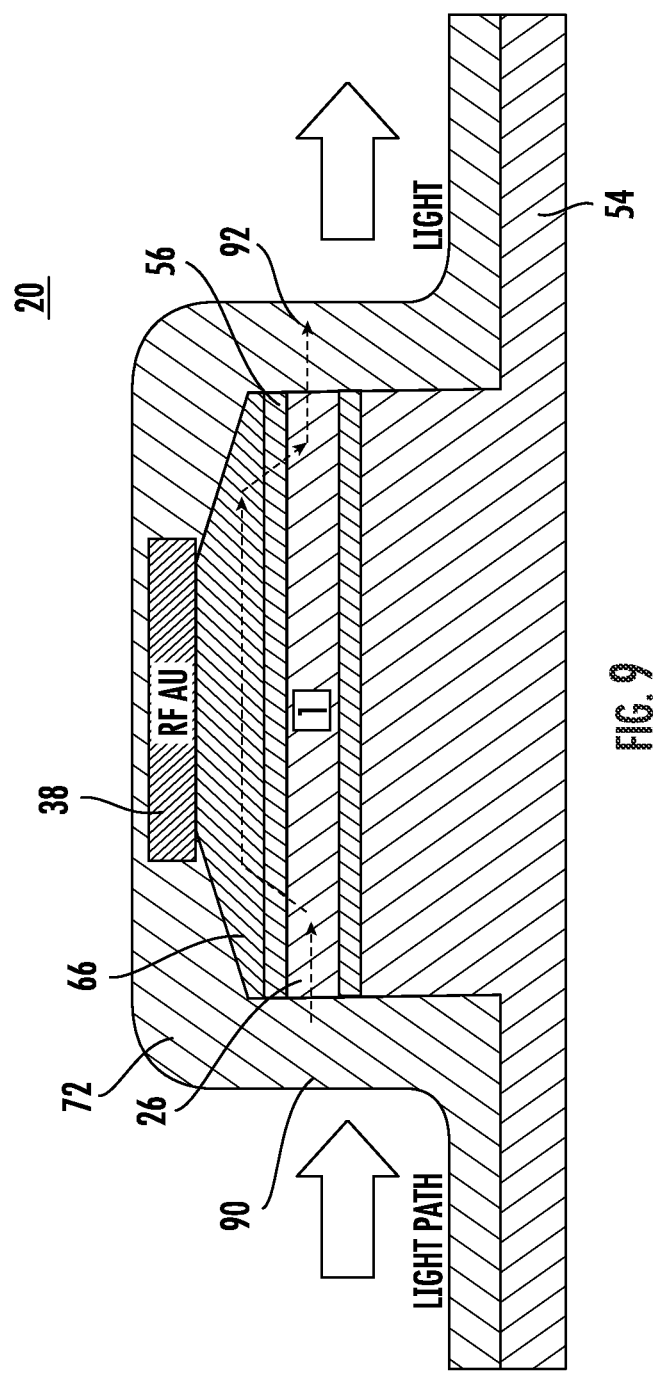
FIG. 9 is a broken away side view similar to FIG. 8 illustrating angulated edges in the conformal ALD sealant layer.

Referring additionally to FIG. 9, a broken away side view similar to FIG. 8 illustrates angulated edges in the conformal ALD sealant layer 72. By carefully etching the edges of the active area during fabrication, sharp coroners can be eliminated so that sharp coroners in conformal ALD sealant layer 72 are eliminated, i.e. the edges are angulated, which makes the conformal layer less prone to degradation and cracking.

Figure 10:
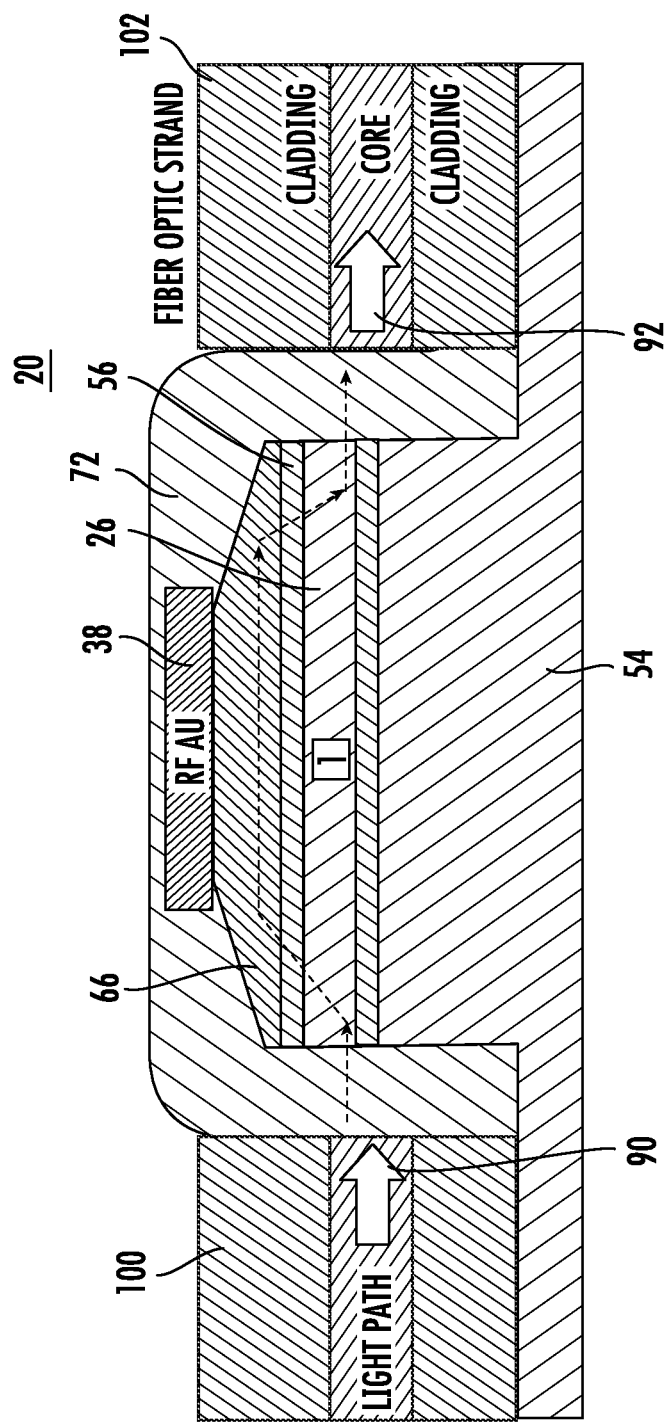
FIG. 10 illustrates the Mach-Zehnder modulator with co-planar electrodes and an angulated conformal ALD sealant layer with aligned fiber optic input and output in accordance with the present invention.

Referring additionally to FIG. 10, a broken away side view similar to FIG. 9 illustrates the addition of a fiber optic cable 100 mounted on substrate 54 and optically aligned with input window 90 in conformal ALD sealant layer 72. Also illustrated is a fiber optic cable 102 mounted on substrate 54 and optically aligned with output window 92 in conformal ALD sealant layer 72. In this specific embodiment, fiber optic cables 100 and 102 are aligned via V-grooves formed in substrate 54, although other methods and apparatus may be used.

Figure 11:
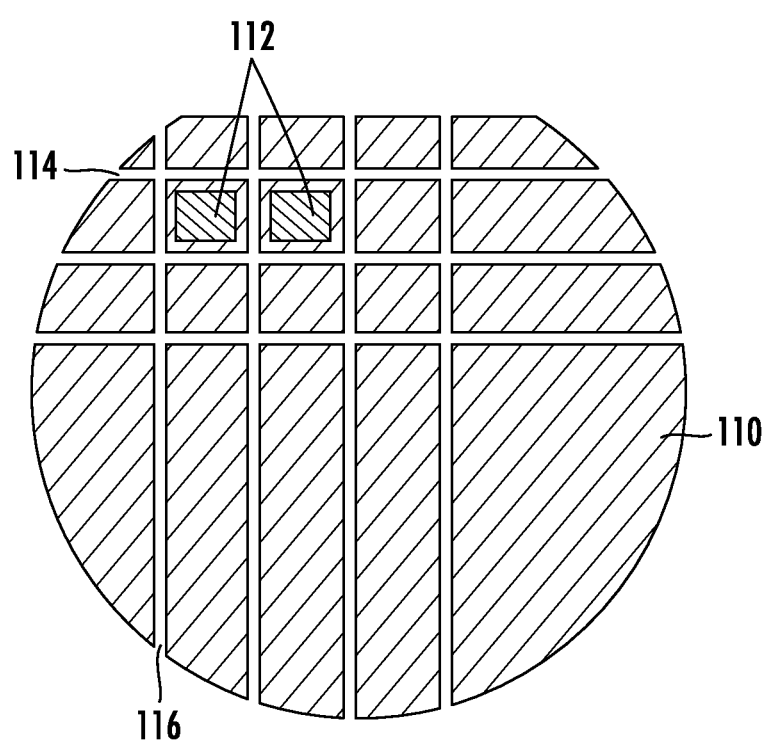
FIG. 11 illustrates a typical wafer dicing layout for the Mach-Zehnder modulator of FIG. 7.

Turning now to FIG. 11, a typical wafer dicing layout for the Mach-Zehnder modulator of FIG. 7 is illustrated. A wafer 110 is illustrated that includes two modulator devices 112 with horizontal dicing cuts 114 and vertical dicing cuts 116 defining the chips. It will be understood that wafer 110 will normally be filled with devices and only two are shown in this example for convenience in understanding.

Referring additionally to FIG. 12 a wafer dicing process for the Mach-Zehnder modulator of FIG. 7 (or any of the other modulators described herein) in accordance with the present invention is illustrated. A die saw wheel 120 is illustrated schematically. Die saw wheel 120 is aligned to cut along horizontal dicing cuts 114 and vertical dicing cuts 116 to cut wafer 110 into chips each containing a Mach-Zehnder modulator 20, in this example. As can be seen in FIG. 12, because of the novel construction of Mach-Zehnder modulator 20 horizontal dicing cuts 114 and vertical dicing cuts 116 are located horizontally away and vertically lower than windows 90 and 92 so that the integrity of windows 90 and 92 is protected during the dicing of wafer 110. Thus, the various structures described above can be fabricated on a wafer level which substantially reduces labor and cost.

Thus, a new and improved hybrid EO polymer modulator with a thin conformal sealant layer or layers has been disclosed. The new and improved hybrid EO polymer modulator and conformal sealant layer includes coplanar active layers and coplanar electrodes. Also, the novel design allows the EO polymer to be conveniently poled and easily encapsulated. Because of the coplanar design complicated deposition of successive layers of cladding and EO polymers are not required. Also, since the active layers are co-planar, adhesive issues for successive layers are not a problem. Further, in the present design, poling voltage is applied to a single EO polymer layer without cladding so that the polling process is not restricted by cladding conductivity. In the present novel design, the critical structure is done on silicon by a state-of-the art CMOS process and the polymer waveguide structure formation does not require a very precise lithographic process over thin film polymer layers. Further, the thin conformal sealant layer or layers can be deposited at the wafer level to provide light input and output windows that retain their integrity during dicing of the wafer.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. An EO polymer modulator with conformal atomic layer deposition sealant layers comprising:
    an active region of a device material stack including an elongated tapered active section positioned on a passive waveguide core;
    the device material stack supported on a substrate with the passive waveguide core defining light input and light output side surfaces; and
    a conformal atomic layer deposition sealant layer overlying the device material stack including the light input and light output side surfaces, the conformal atomic layer deposition sealant layer defining windows for the light input and light output side surfaces.

2. The EO polymer modulator with conformal atomic layer deposition sealant layers as claimed in claim 1 wherein the windows for the light input and light output side surfaces are positioned above and spaced from an upper surface of the substrate.

3. The EO polymer modulator with conformal atomic layer deposition sealant layers as claimed in claim 2 wherein the substrate is a wafer.

4. The EO polymer modulator with conformal atomic layer deposition sealant layers as claimed in claim 3 wherein the wafer includes a plurality of EO polymer modulators with conformal atomic layer deposition sealant layers formed on the upper surface and spaced apart to define open upper surface areas between adjacent ones of the plurality of EO polymer modulators with conformal atomic layer deposition sealant layers.

5. The EO polymer modulator with conformal atomic layer deposition sealant layers as claimed in claim 4 further including a plurality of dicing cuts on the upper surface of the wafer in the open upper surface areas between the plurality of EO polymer modulators with conformal atomic layer deposition sealant layers and the windows for the light input and light output side surfaces being positioned above and spaced from the open upper surface areas of the substrate.

6. The EO polymer modulator with conformal atomic layer deposition sealant layers as claimed in claim 1 wherein junctures between upper surfaces and light input and light output side surfaces of the device material stack and the substrate are angulated.

7. An EO polymer modulator with conformal atomic layer deposition sealant layers comprising:
    a substrate with a cladding layer formed on a surface;
    a passive waveguide core, having a cross-sectional area, formed in the cladding layer and including an elongated tapered active section;
    an elongated trench in the cladding layer, the elongated tapered active section of the waveguide core positioned in the elongated trench;
    electrodes positioned on a surface of the cladding layer on opposite sides of the elongated trench;
    an elongated strip of EO polymer overlying the elongated tapered active section of the waveguide core, the elongated strip of EO polymer positioned between and parallel with the electrodes and coplanar with the electrodes; and
    a conformal sealant layer overlying the elongated strip of EO polymer and sealing sides and top of the passive waveguide core and the elongated strip of EO polymer.

8. The EO polymer modulator with conformal atomic layer deposition sealant layers as claimed in claim 7 wherein the device material stack is supported on a substrate with the passive waveguide core defining light input and light output side surfaces.

9. The EO polymer modulator with conformal atomic layer deposition sealant layers as claimed in claim 8 wherein the substrate is a wafer.

10. The EO polymer modulator with conformal atomic layer deposition sealant layers as claimed in claim 9 wherein the wafer includes a plurality of EO polymer modulators with conformal atomic layer deposition sealant layers formed on the upper surface and spaced apart to define open upper surface areas between adjacent ones of the plurality of EO polymer modulators with conformal atomic layer deposition sealant layers.

11. The EO polymer modulator with conformal atomic layer deposition sealant layers as claimed in claim 10 further including a plurality of dicing cuts on the upper surface of the wafer in the open upper surface areas between the plurality of EO polymer modulators with conformal atomic layer deposition sealant layers and the windows for the light input and light output side surfaces being positioned above and spaced from the open upper surface areas of the substrate.

12. The EO polymer modulator with conformal atomic layer deposition sealant layers as claimed in claim 8 wherein junctures between upper surfaces and light input and light output side surfaces of the device material stack and the substrate are angulated.

13. A method of fabricating an EO polymer modulator with conformal atomic layer deposition sealant layers comprising the steps of:
    providing a substrate and forming an active region of a device material stack including an elongated tapered active section positioned on a passive waveguide core, the device material stack supported on the substrate with the passive waveguide core defining light input and light output side surfaces;

using atomic layer deposition deposit a plurality of atomic layers over the device material stack to form a conformal sealant layer over an upper surface and light input and light output side surfaces of the device material stack.

14. The method as claimed in claim 13 wherein the conformal sealant layer includes any of a super lattice design, combinations of more than one oxide, combinations of oxide and nitride, or two oxides and one nitride, or two nitrides and one oxide.

15. The method as claimed in claim 13 wherein the conformal sealant layer includes at least one of aluminum oxide or titanium oxide.

16. The method as claimed in claim 13 wherein junctures between the upper surface and light input and light output side surfaces of the device material stack and the substrate are angulated.

17. The method as claimed in claim 13 wherein the substrate is a wafer.

18. The method as claimed in claim 17 wherein the wafer includes a plurality of device material stacks with conformal atomic layer deposition sealant layers formed on the upper surface and spaced apart to define open upper surface areas between adjacent ones of the plurality of device material stacks with conformal atomic layer deposition sealant layers.

19. The method as claimed in claim 18 further including a plurality of dicing cuts on the upper surface of the wafer in the open upper surface areas between the plurality of EO polymer modulators with conformal atomic layer deposition sealant layers and the windows for the light input and light output side surfaces being positioned above and spaced from the open upper surface areas of the substrate.

* * * * *